United States Patent Office 2,814,537
Patented Nov. 26, 1957

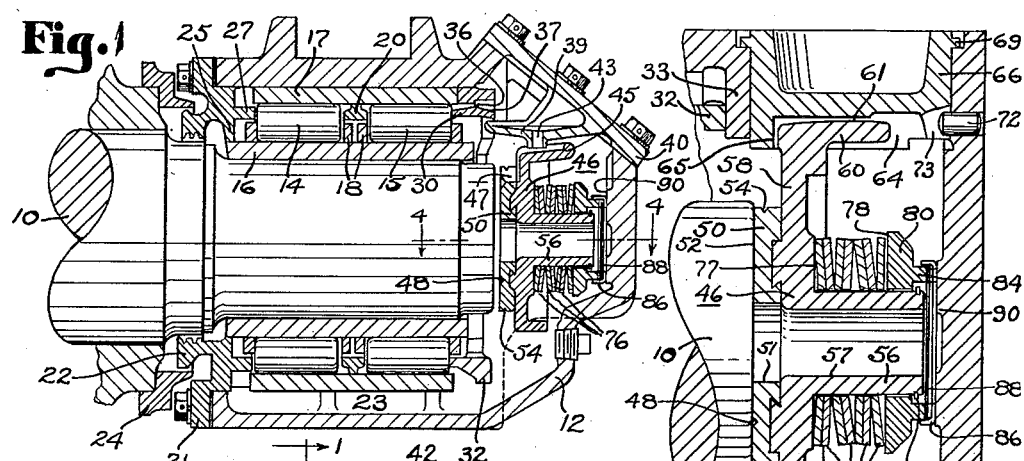

2,814,537

JOURNAL BOXES

Richard J. Brittain, Jr., Berkeley Heights, N. J., assignor to General Motors Corporation, Detroit, Mich., a corporation of Delaware Application August 30, 1954, Serial No. 452,868

9 Claims. (Cl. 308—41)

This invention relates to journal boxes and particularly to an improved resilient thrust receiving arrangement for absorbing and yieldably cushioning relative endwise movements between a railway axle and a journal box that rotatably receives the axle.

An object of this invention is to provide a journal box having an improved thrust arrangement of simple economical construction which yieldably cushions and limits the endwise thrusts of an axle.

Another object is to provide an improved thrust receiving device which will accommodate itself to movements of an axle and which will accept endwise thrusts of the axle over a full area of contact while resiliently absorbing the thrusts of the axle.

A further object is to provide an improved thrust receiving assembly which may be quickly and easily installed in and removed from a journal box.

To these ends and also to improve generally upon devices of this character, the invention consists in the various matters hereinafter described and claimed. In its broader aspects, the invention is not necessarily limited to the specific structures selected for illustrative purposes in the accompanying drawings wherein:

Figure 1 is a vertical cross section through my journal box taken along the line 1—1 of Figure 2.

Figure 2 shows a fragmentary front end of the journal box broken away in vertical section to illustrate the internal construction.

Figure 3 is a plan view of my journal box with the cover removed.

Figure 4 shows an enlarged fragmentary section taken alone the line 4—4 of Figure 1 and illustrating the thrust absorbing arrangement under load.

Figure 5 is a fragmentary vertical section through the front of my box with the thrust absorbing arrangement removed.

An axle 10 is mounted for antifrictional rotation in a journal box 12 by two similiar rows of bearing rollers 14 and 15 that are free to roll upon a hardened inner raceway sleeve 16 pressed over a reduced end 11 of the axle and upon the inner periphery of a hardened outer raceway sleeve 17 pressed into the journal box. The axle is also arranged for a limited endwise shifting movement while rotatably supported by the rows of bearing rollers. The rollers of each row are circumferentially spaced as by a rotatable cage 18. A rotatable intermediate ring 20 slidably journalled in the sleeve 17, axially spaces the rows of rollers 14 and 15 with respect to each other. Suitable lubricant such as oil is located in a lubricant chamber 23 from which the lubricant has access to the rollers.

An annular end cap 21 suitably fastened as by cap screws to the rearward end of the journal box, has a grooved annular flange 22 closely surrounding the reduced cylindrical portion of the axle to prevent lubricant leakage from the rearward end of the box. An annular slinger 24 rotatable with the axle 10 shields the flange 22 and directs dirt and water away from the end cap 21.

The end cap 21 also has an annular rib 25 in closely spaced surrounding relation about the end of the sleeve 16, and a hardened annular portion 27 of this end cap 21 extends slightly within the outer raceway sleeve 17 in radially spaced relation to this sleeve and the adjacent cage 18 to engage and guide the inner row of rollers 14. Similarly, a hardened annular projection 30 on a lubricator ring 32 slidably seated in the journal box between the end of the raceway sleeve 17 and an inwardly extending abutment rib 33 (Figure 4) guides the outer row of bearing rollers 15. The lubricator ring 32 which is restrained from rotation by scerws one of which is indicated at 34 (Figure 2), receives oil from the bearing rollers, this oil being directed through a passage 36 and by an inclined rib 37 into a pan 39 extending from an inclined cover 40 normally closing an opening 42. The cover 40 is demountably held in position against a suitable gasket on the box as by screws.

Oil entering the pan 39 drains through a hole 43 onto an inclined lip 45 on the top of a thrust block 46 from which the lubricant may flow into a pocket 47 communicating with an eccentric lubricating groove 48 cut in the end of a facing member 50 engageable with the end of the axle 10. This facing member 50 which may be cast in interlocked relation with ribs or grooves on the thrust block 46, may be composed of bronze or other suitable material having a low coefficient of friction against the end of the steel axle in the presence of lubricant, and is provided with a flat axle engaging face 52 preferably of the same size as the flat end of the axle which it may engage. A witness groove 54 is provided at the periphery of the facing member 50 so that the distance between this witness groove and the axle engaging face of the member 50 may be occasionally measured to determine the extent of facing member wear and when it is desirable to replace this facing member.

The thrust block 46 has a forwardly extending tubular portion 56 provided with a bore 57 therethrough substantially coaxial of the axle. The facing member 50 is also provided with a central through bore 51 which is co-extensive with the bore 57. These bores 51 and 57 reduce the weight of the thrust block, aid lubrication and provide for better cooling of the thrust block. The thrust block at its end nearest the axle has a pair of similar side arms 58 projecting laterally from each other in opposite directions. Each of these arms terminates in a forwardly extending generally rectangular foot 60 provided with an arcuate end face 61 and loosely and slidably supported by the top and bottom walls of a rectangular recess 64, each recess being longer than the foot 60 therein to provide for endwise movement of the thrust block under endwise thrust from the axle 10. The forward movement of the thrust block 46 is limited by engagement of the feet 60 respectively against forward end walls 65 of the recesses 64. Each rectangular recess 64 is located in the inner end of a swivel bushing 66 received in a bore through the side of the box 12 and demountably fastened in position by a plate 68 that is removably secured to the side of the box as by screws. The swivel bushings are each provided with an annular flange 69 seated against the bottom of a counterbore in the box 12 to locate the inward positions of these bushings so that the arcuate end faces of the feet 60 may freely move within their respective recesses 64 and will not be cramped against the bushings 66. Pins 72 mounted in and extending through the forward end of the box are loosely received in bushing slots 73 which are wider than the diameter of the pins to allow for the required amount of swivel movement of these bushings to permit a tilting movement of the thrust block about a horizontal axis thus facilitating a flat faced engagement of the facing member 50 against the end of the axle during an endwise thrust of the axle against the thrust block. The slidable movement of each foot 60 within its respective recess provides for a tiltable movement of the thrust block with respect to a vertical axis to also aid the flat contact engagement of the facing member 50 against the axle end.

A spring arrangement herein shown as a series of cooperating dished frusto-conical resilient washers 76, commonly known as Belleville washers, is slidably mounted over the cylindrical outer periphery of the tubular portion 56 between a flat annular thrust block face 77 and a flat annular face 78 on a collar 80 slidably mounted over the end of the tubular portion 56. Some of the adjacent Belleville washers are preferably dished in opposite relation to each other to provide for cooperative compressible spring action between the opposing faces 77 and 78. A snap ring 82 demountably seated in a groove in the end of the tubular portion serves to secure the collar 80 and Belleville washers 76 in unit handling assembly with the thrust block 46. An annular flange 84 terminating in a flat face projects axially from the body of the collar 80 and has pressed thereover in tight fitting relation, an annular cap 86 having a peripheral flange in frictional binding relation about the flange 84. A series of annular shims 88 are held within the cap 86 between the collar flange 84 and the cap whose forward flat face is engageable with the flat face of a boss 90 projecting from the forward end wall of the journal box 12. The shims 88 are preferably chosen of a sufficient number and aggregate thickness to provide an initial preload on the Belleville washers 76 which locates the thrust block 46 against the recessed end walls 65 and cap 86 against the flat face of the box 90 in the forward end of the journal box.

In operation, normally, there is a slight spacing between the flat end of the axle and the adjacent facing member 50. When a car equipped with this journal box negotiates rough portions of track or curves, the axle may shift endwise and engage the facing member 50 causing a compression of the Belleville washers 76 which rapidly build up a resilient resistance that yieldably absorbs the endwise axle thrust. If the thrust is sufficient, the endwise movement of the axle towards the thrust block 46 is finally limited by compression of the Belleville washers to a substantially flat condition at which time no further endwise movement of the axle towards the thrust block can occur since the thrust block, Belleville washers, and collar 80 serve as a combined solid block backing against the boss 90. When the axle moves endwise away from the thrust block 46, the combined resilient action of the Belleville washers 76 again yieldably locates the thrust block 46 against the end walls 65 of the swivel bushing recesses 64 preparatory to cushioning action for absorbing axle thrusts.

I claim:

1. In a journal box having an axle journalled for rotation and shiftable endwise therein, a thrust block normally spaced from the end of the axle and arranged to be engaged by and to yieldably receive endwise thrusts of the axle, members mounted in the sides of the journal box and supporting the thrust block in the journal box for slidable movement endwise of the axle towards and from an end wall of the journal box, a cylindrical thrust block extension projecting into spaced relation with said end wall, a collar supported by the extension for slidable movement on said extension, and a plurality of cooperating resilient members slidably mounted on the extension for resilient compression between the thrust block and the collar to yieldably cushion and limit end thrust of the axle against said thrust block.

2. In a journal box having an axle journalled for rotation and shiftable endwise therein, a thrust block normally spaced from the end of the axle and arranged to be engaged by and to yieldably cushion endwise thrusts of the axle, members in the sides of the journal box slidably supporting the thrust block in the journal box for movement endwise of the axle towards and from an end wall of the journal box, a tubular thrust block extension projecting endwise of the axle into spaced relation with said end wall, a collar supported by the tubular extension for freely slidable movement on said extension, the collar being engageable with said end wall, and a plurality of opposingly dished resilient washers slidably mounted on the extension between the collar and the thrust block for resiliently absorbing and limiting movements of the thrust block towards said end wall.

3. In a journal box having an axle journalled for rotation and shiftable endwise therein, a thrust block normally spaced from the end of the axle and engageable therewith to receive and cushion endwise thrusts of the axle, lateral thrust block projections slidably supported in the sides of the box, a cylindrical thrust block extension endwise of the axle, a collar supported by and axially slidable on said extension and engageable with an end wall of the journal box, and a plurality of cooperating resilient washers slidably supported on the extension between the thrust block and said collar, said washers yieldably absorbing and limiting the endwise movement of the axle against the thrust block.

4. In a journal box having an axle journalled for rotation and shiftable endwise therein, a thrust block normally spaced from the end of the axle and arranged to be engaged by and to yieldably receive endwise thrusts of the axle, members projecting through the sides of the box and slidably supporting the thrust block in the journal box for movement endwise of the axle towards and from an end wall of the journal box, a cylindrical thrust block extension projecting into spaced relation with said end wall, a collar slidably mounted on the extension and engageable with said end wall, a plurality of resilient washers slidably mounted on the extension between the collar and the thrust block, and a demountable member on the thrust block securing the collar and the washers in unit-handling relation with the thrust block.

5. In a journal box having an axle journalled for rotation and shiftable endwise therein, a thrust block normally spaced from the end of the axle and arranged to be engaged by and to yieldably receive endwise axle thrusts, laterally extending arms on the thrust block, supporting members demountably received in the sides of the box, an end of each arm being demountably received in and being tiltable and slidably supported in one of the supporting members, a cylindrical tubular extension on the thrust block projecting endwise of the axle into spaced relation with an end wall of the box, a collar slidably journalled on the extension and abutting said end wall, and a plurality of resilient washers slidably mounted on the tubular extension between the collar and a shoulder on the thrust block.

6. In a journal box having an axle journalled for rotation and axially shiftable therein, a thrust block normally spaced from the end of the axle and arranged to be engaged by and to yieldably receive endwise axle thrusts, laterally extending arms on the thrust block, supporting members demountably journalled in the sides of the box, an end of each arm being slidably supported in one of the supporting members, a cylindrical tubular extension on the thrust block projecting endwise of the axle into spaced relation with an end wall of the box, a thrust block shoulder at the inner end of the tubular extension, a collar slidably journalled on the tubular extension and abutting said end wall, and a plurality of cooperating resiliently yieldable washers slidably mounted on the tubular extension under initially predetermined compression between the collar and said thrust block shoulder.

7. In a journal box having an axle journalled for rotation and shiftable endwise therein, a thrust block normally spaced from the end of the axle and arranged to be engaged by and to yieldably receive endwise axle thrusts, laterally extending arms on the thrust block, supporting members demountably journalled in the sides of the box and slidably supporting the ends of the arms for movements endwise of the axle, a cylindrical tubular thrust block extension projecting from the arms into spaced relation with an end wall of the box, a thrust block shoulder at the inner end of the tubular extension, a collar slidably supported for axial movement on the extension and engageable with said end wall, a plurality of axially resilient washers slidably mounted on the extension between the shoulder and said collar, and means securing the thrust block and washers and collar together as a unit-handling assembly.

8. In a journal box having an axle journalled for rotation and shiftable endwise therein, a thrust block normally spaced from the end of the axle and arranged to be engaged by and to yieldably receive endwise axle thrusts, laterally extending arms on the thrust block, bushings demountably journalled in the sides of the box and slidably supporting the arms for thrust block movement endwise of the axle, a tubular thrust block extension projecting from the arms into spaced relation with an end wall of the box, a thrust block shoulder adjacent said arms, a collar mounted on the extension for axially slidable movement thereon and engageable with said end wall, and a plurality of resilient dished washers slidably mounted on the tubular thrust block extension, said resilient washers cooperatively exerting a resiliently yieldable thrust against said shoulder and against said collar to urge the thrust block towards the end of the axle.

9. In a journal box having an axle journalled for rotation and shiftable endwise therein, a thrust block normally spaced from the end of the axle and arranged to be engaged by and to yieldably receive endwise axle thrusts, laterally extending arms on the thrust block, bushings demountably journalled in the sides of the box, each bushing having an elongated recess for slidably and tiltably receiving one of said arms, means limiting the rotatable movement of the bushings, a thrust block shoulder adjacent the arms, a cylindrical tubular thrust block extension projecting axially of the axle and terminating in spaced relation to an end wall of the box, a collar mounted on the extension for axially slidable movement thereon and engageable with said end wall, and a plurality of resilient washers slidably mounted on the tubular extension and cooperatively exerting an axial thrust against said shoulder and against said collar to urge the thrust block towards the axle.

References Cited in the file of this patent

UNITED STATES PATENTS

| | | |
|---|---|---|
| 2,273,308 | Young | Feb. 17, 1942 |
| 2,432,717 | Berger | Dec. 16, 1947 |
| 2,672,382 | Brittain | Mar. 16, 1954 |

FOREIGN PATENTS

| | | |
|---|---|---|
| 520,356 | France | June 24, 1921 |